April 17, 1951     T. G. LINDERME     2,549,318
MULTIPLE DRILL HEAD

Filed July 21, 1947     3 Sheets-Sheet 1

INVENTOR.
THEODORE G. LINDERME.
BY
ATTORNEY.

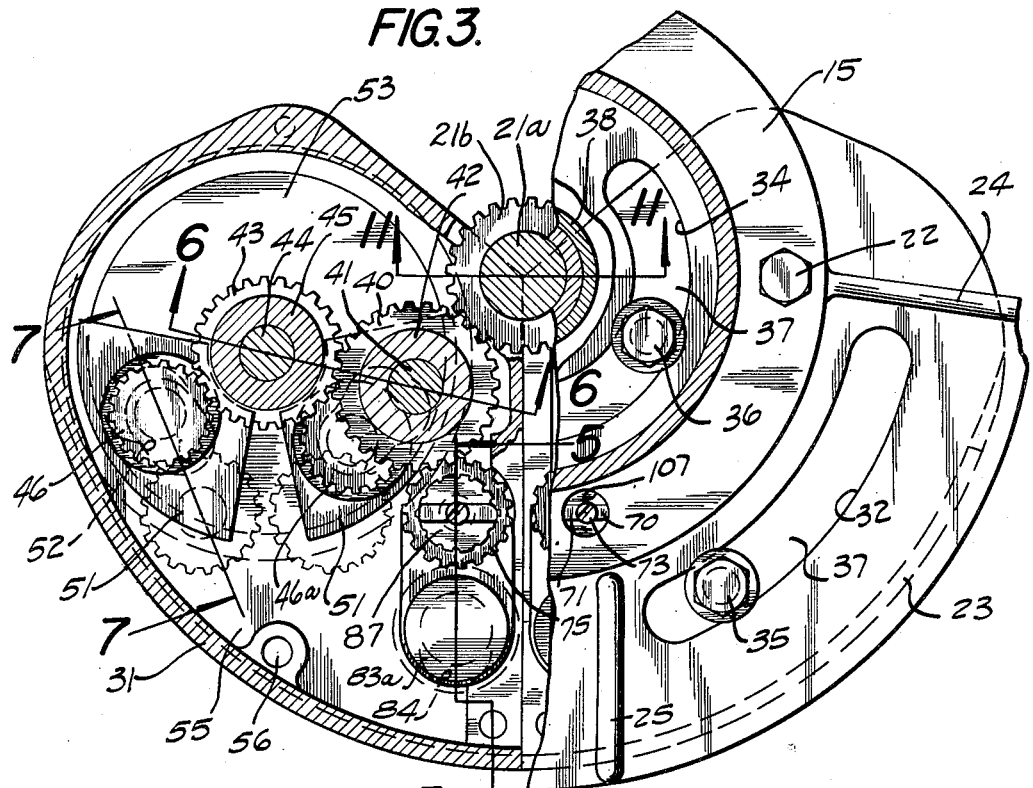
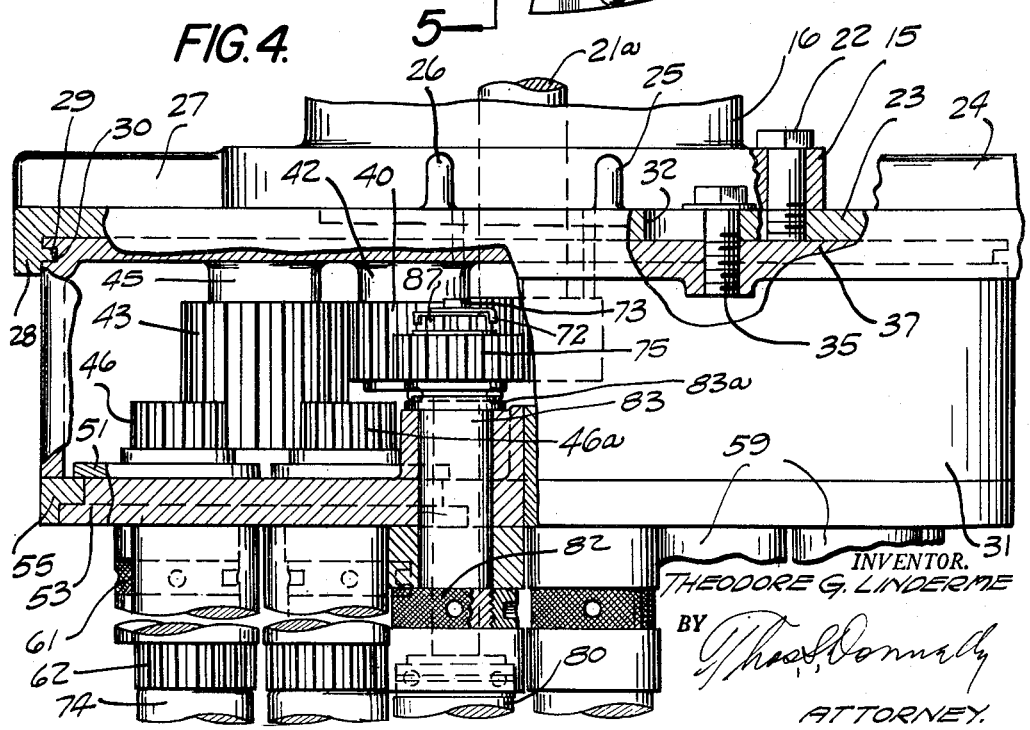

April 17, 1951 T. G. LINDERME 2,549,318
MULTIPLE DRILL HEAD
Filed July 21, 1947 3 Sheets-Sheet 3
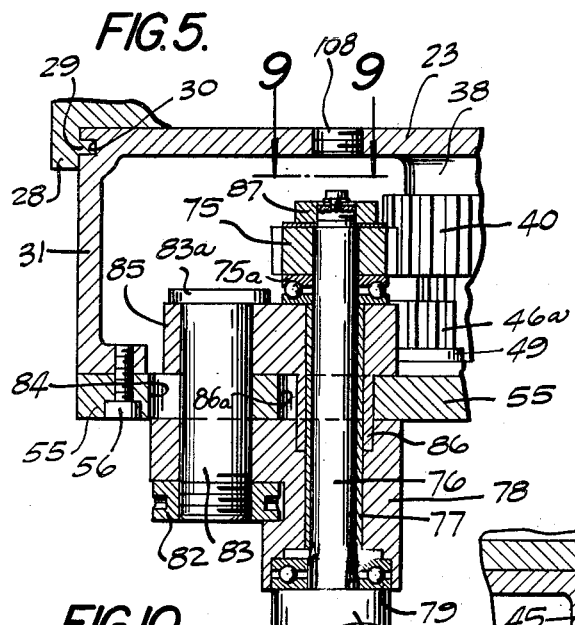
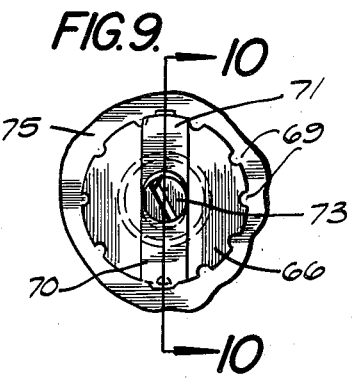
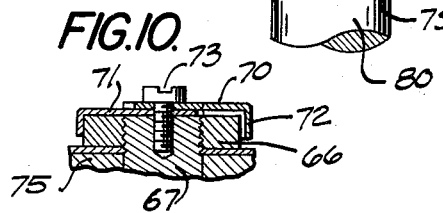
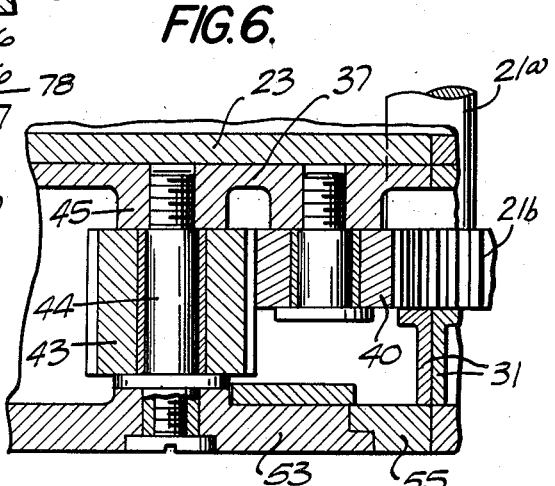
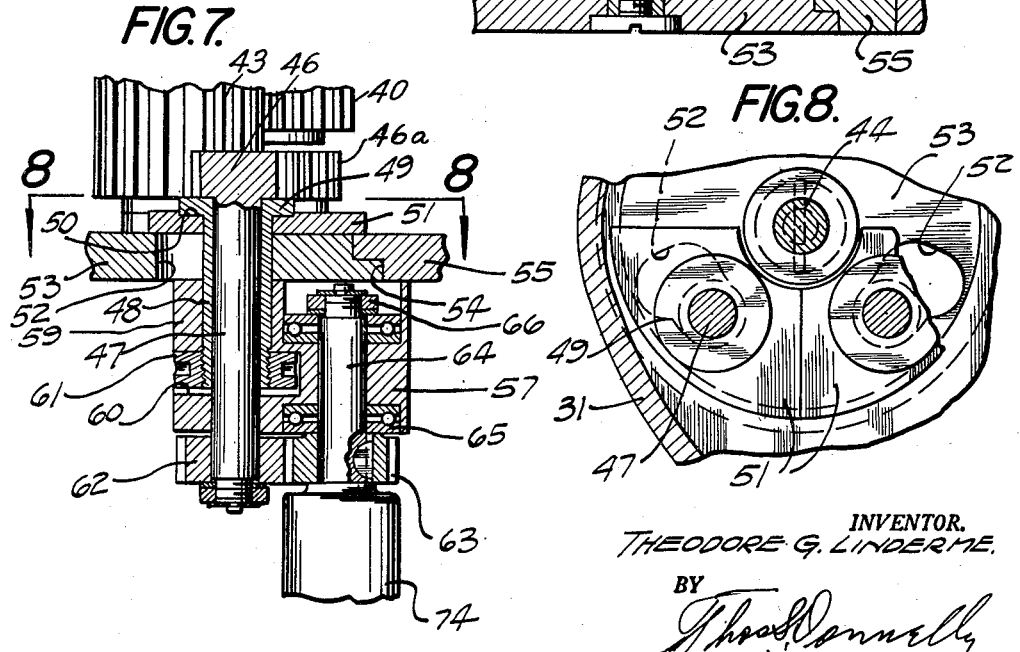
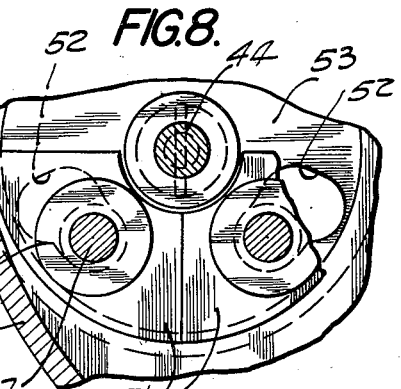
INVENTOR.
THEODORE G. LINDERME.
BY
Thos. Donnelly
ATTORNEY.

Patented Apr. 17, 1951

2,549,318

UNITED STATES PATENT OFFICE 2,549,318

MULTIPLE DRILL HEAD

Theodore G. Linderme, Detroit, Mich.

Application July 21, 1947, Serial No. 762,273

6 Claims. (Cl. 77—24)

My invention relates to a new and useful improvement in a multiple drill head adapted for mounting on a drill press or for being constructed on a drill press as an integral part thereof.

It is an object of the invention to provide a multiple drill head of this class which will be highly efficient in use, economical of manufacture and easily and quickly mounted in position and adjusted to its various positions.

Another object of the invention is the provision of a multiple drill head having a plurality of driving spindles relatively movable to each other so that the drills, each of which may be driven by one of the driving spindles, may be adjusted angularly of each other and as to the space between each other, thus making it possible to drill a plurality of holes simultaneously regardless of the spacing or relative position of the holes to be drilled.

Another object of the invention is the provision in a multiple drill head of a pair of relatively swingable housings, each of which carries a plurality of drill spindles, and each of which drill spindles is relatively movable in the housing which carries it.

Another object of the invention is the provision in a multiple drill head of a plurality of drill spindles, each of which may be moved to inoperative position at will so that when one is moved to inoperative position, the others may be operated.

Another object of the invention is the provision in a multiple drill head of a construction which will permit a maximum adjustment and maneuverability of the various drill spindles.

Other objects will appear hereinafter.

It is recognized that various modifications and changes may be made in the detail of structure illustrated without departing from the invention and it is intended that such shall be embraced within the scope of the claims which form a part hereof.

Figure 1:
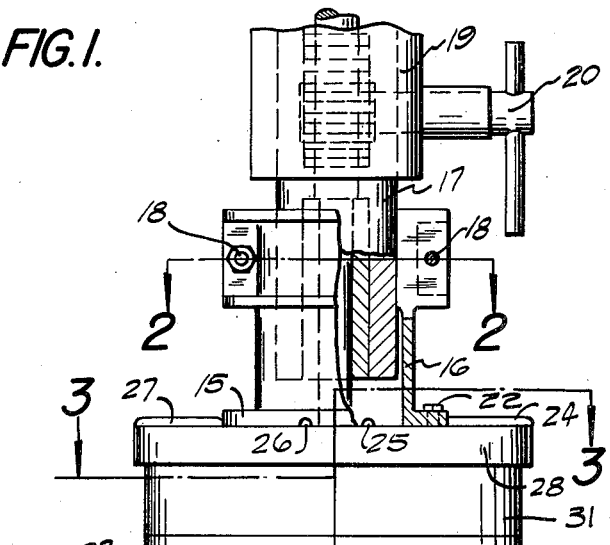
Figure 11:
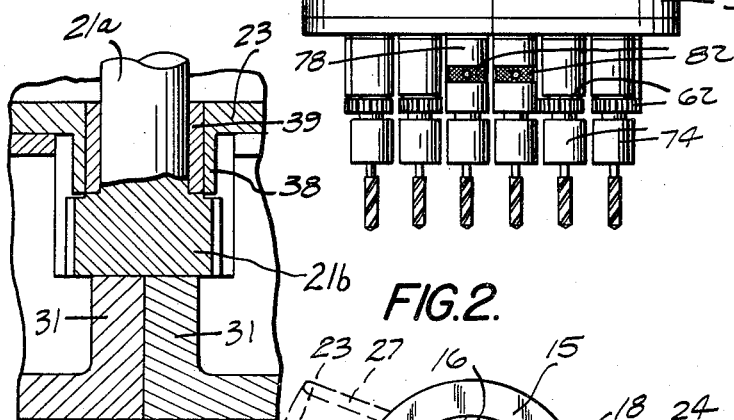
Figure 2:
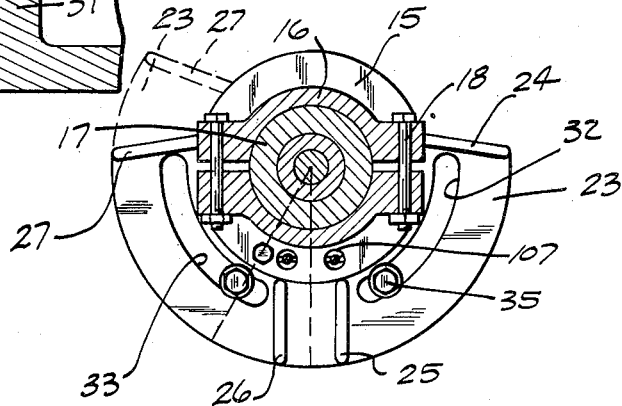

Forming a part of this specification are drawings in which,

Fig. 1, is a front elevational view of the invention with parts broken away and parts shown in section, Fig. 2, is a sectional view taken on line 2—2 of Fig. 1, Fig. 3, is an enlarged sectional view taken on line 3—3 of Fig. 1, Fig. 4, is an enlarged elevational view with parts broken away and parts shown in section, Fig. 5, is a fragmentary, sectional view taken on line 5—5 of Fig. 3, Fig. 6, is a fragmentary, sectional view taken on line 6—6 of Fig. 3, Fig. 7, is a fragmentary, sectional view taken on line 7—7 of Fig. 3, Fig. 8, is a sectional view taken on line 8—8 of Fig. 7, Fig. 9, is a view taken on line 9—9 of Fig. 5, Fig. 10, is a sectional view taken on line 10—10 of Fig. 9, Fig. 11, is a sectional view in fragment taken on line 11—11 of Fig. 3.

In the drawings, I have illustrated the invention comprising a retaining collar 16 carrying at its lower end the outwardly projecting flange 15 and adapted for embracing the quill 17 of a drill spindle 19. This collar 16 is split at its upper end and held in clamping relation about the quill 17 by means of the bolts 18. The quill may be raised and lowered relatively to the spindle 19 by means of the rotatable shaft 20. The flange 15 is secured by the bolts 22 to a supporting plate 23. This plate 23 is provided with the inwardly projecting ribs 24, 25, 26 and 27 which serve as re-enforcement members.

The plate 23 is provided with the axially directed flange 28 which projects downwardly from the plate 23 and which is provided with an inwardly projecting rib 29 engageable in the groove 30 formed in the housing wall 31. In the present invention I provide a pair of these housings which have the housing wall 31 and all of the parts of these housings are identical and the contents thereof are identical so that a description of one will suffice for a description of both. Formed in the plate 23 is a pair of spaced apart, outwardly positioned, arcuate slots 32 and 33. An inwardly positioned, arcuate slot is also provided and one of these slots is indicated at 34 in Fig. 3. Extended through these slots are bolts 35 and 36 which thread into the top wall 37 of the housing and serve as a means for supporting the housing on the supporting plate 23. This plate 23 is provided with the downwardly projecting hub 38 which embraces the bushing 39 in which the drive shaft 21a of the drill rotates. The housings may swing on the supporting plate 23 about the axis of the drive shaft 21a, the arcs 32, 33 and 34 being struck on the center of the drive shaft 21a.

Mounted on the lower end of the drive shaft 21a and rotating in unison therewith is the driving gear 21b. The gearing in each of the housings is identical so that a description of one will suffice for the structure contained within the other housing. The driving gear 21b meshes with the idler gear 40 which is mounted on the stub shaft 41 which is threaded into the hub 42 extending downwardly from the top plate or wall 37 of the housing. This idler gear 40 meshes with the gear 43 which is mounted on the shaft 44 (see Fig. 6 and Fig. 4). This shaft 44 is threaded into the hub or boss 45 projecting downwardly from the top wall 37. As shown in Fig. 6, the driving gear 39 projects through one of the side walls 31 of each of the housings so this driving gear projects into each of the housings.

The gear 43 meshes with the gear 46 (see Fig. 4 and Fig. 7) which is mounted on the shaft 47 and which extends through the sleeve 48 having the radially directed flange 49 at its upper end engaging in a recess 50 formed in the upper face of the plate 51 which rests upon the inner surface of the bottom 55 of the housing. This plate 51 also overlies the plate 53 which is circular in formation and which seats in the circular opening 54 formed in the bottom 55 of the housing and may rotate therein. Formed in this circular plate 53 is a slot 52 through which the sleeve 48 projects. As shown in Fig. 5, the bottom 55 of the housing is held in position relatively to the wall 31 by means of the screws 56. As shown in Fig. 7, I provide a block 57 having a portion 59 through which the sleeve 48 projects. This portion 59 is provided with a recess 60 for receiving a nut 61 which may be threaded on the lower end of the sleeve 48. Fixedly mounted on the lower end of the shaft 47 is a gear 62 meshing with a gear 63, fixedly mounted on the drill spindle 64 which is journaled in the bearings 65 and provided on its upper end with a nut 66 threaded thereon. This nut 66 serves to retain the spindle 64 in position and also serves as a means for adjusting the same longitudinally or axially. As shown in Fig. 9, the nut 66 is provided with a plurality of peripheral notches 69. Secured, as shown in Fig. 10, by means of the screw 73 to the upper end 67 of the shaft 64 is a pair of spring plates 70 and 71 having the downwardly projecting portions 72 which serve to engage in the notches 69 and prevent rotation of the nut 66, thus preventing undue threading of the nut on the threaded portion 67 of the spindle 64. Carried by the lower end of the spindle 64 is a chuck 74 in which a drill may be attached in a well known manner.

The construction is such that when the drive shaft 21a is rotated, the spindle 64 will be rotated and also the gear 46 which is in mesh with the gear 43. Upon loosening the nut 61, the block 57 may be swung on the sleeve 48 as an axis so that the position of the spindle may thus be adjusted, moving in a predetermined arc. When the proper adjustment has been obtained, the nut 61 may be tightened to securely bind the parts in fixed relation. Another adjustment which may be made upon loosening the nut is a bodily movement of the block 57, the sleeve 48 and the plates 51, the sleeve 48 moving in the slot 52. As shown in Fig. 8, this slot 52 has an outward bulge at one end and when the sleeve 48 is moved to the outer end and then moved into this bulged portion, the gear 46 will be moved out of mesh with the gear 43, thus rendering the spindle 64 inoperative for use while in that position.

As shown in Fig. 4, a gear 46a also meshes with the gear 43. This gear 46a is mounted and functions and operates exactly the same as the gear 46 so that the various parts illustrated in Fig. 7 relatively to the gear 46 are also descriptive of the parts associated with the gear 46a and driven by this gear so that there is thus provided a description of a pair of drill spindles in the housing.

As shown in Fig. 4, a gear 75 also meshes with the gear 40 and as shown in Fig. 5, this gear 75 is fixedly mounted on the drill spindle 76 which projects through the bushing 77. This bushing 77 also projects through the block 78 in the lower end of which is mounted a bearing 79 for the spindle 76 which carries the chuck 80 at the lower end to which the drill may be attached. Formed in the block 78 is a groove or recess to accommodate the nut 82 threaded on the lower end of the stud 83 which projects through the slot 84 formed in the bottom 55 and which also projects through the block 85 positioned on the inner face of the bottom 55. The stud 83 is provided with the head 83a which bears against the inner face of the block 85. This block 85 is provided with the downwardly projecting sleeve 86 which embraces the bushing 77 and which extends through a slot 86a formed in the bottom 55. Threaded on the upper end of the spindle 76 is a nut 87 for adjusting the same longitudinally or axially and which serves to retain the gear 75 in engagement with the bearing 75a. The construction is such that when the gear 40 is rotated, the spindle 76 will be rotated so long as the gear 75 is in mesh with the gear 40. By loosening the nut 82, the block 78 and its associated parts may be moved, the stud 83 riding in the slot 84 and the spindle 76 and its associated parts riding in the slot 86a so that the gear 75 may be moved out of mesh with the gear 40.

In this manner, I provide a multiple drill head having a pair of housings which are swingable relatively to each other and each of which is shown to carry three drill spindles. In Fig. 3, I have shown the housings moved into approach to each other, the adjacent walls contacting. These housings may be swung outwardly, one to the left and one to the right to the limit of the slots 32 and 34 and the swinging of these housings in no manner interferes with the adjustment or the swinging of the various drill spindles in each housing. In Fig. 3, I have shown in dotted lines, two of the drill spindles or the gears for driving the same swung to lie in alignment with the gear 75 which is in axial alignment with the drill spindle 76. Consequently, when the various parts are moved into the position thus shown, the six drill spindles would be in alignment with each other and the spacing would be a predetermined spacing. By virtue of the various adjustments and movements which have been described, it becomes possible within the limits of each of the housings and within the limits of relative swinging of the two housings, to adjust these six drill spindles into almost any relative position with any desired spacing. The adjustment and the spacing is easily and quickly effected so that, as experience has shown, a drill head constructed in this manner is most efficient and practical and results in great saving of labor.

It will be noted that when the block 57, clearly shown in Fig. 7, is swung on the axis of the sleeve 48, after the sleeve 48 has been moved into the outwardly bulged portion of the slot 52, the screw 73 will have been swung clear of the housing wall so that it may be operated upon by a screw driver, thus making it possible to rotate the nut 66 and adjust end play on the member 64. It will also be noted that the spindle 64 may thus be removed entirely from its bearing if desired. It will also be noted that the block 57 may be removed from the sleeve 48 upon unsetting the nut 61 from the sleeve 48, without, in any manner, disturbing the mounting of the sleeve 48 or the shaft or spindle 47 which extends therethrough. Similarly, by removing the plug 108, which is accessible through the opening 107, formed in the flange 15, the screw, which threads into the spindle 76, may be removed so that the nut 87 may be either tightened or loosened as desired so that the necessary adjustments may thus be made and removal and replacement of the spindle 76 effected when desired or necessary.

What I claim as new is:

1. In a multiple drill head of the class described, a housing; a bottom on said housing, said bottom having an opening formed therein; a plate positioned in said opening and swingable relatively to said bottom, said plate having a pair of slots formed therein; a shaft projected through each of said slots and depending at one end below said bottom; a support rotatably mounted on each of said shafts and having a supporting portion extending radially outwardly therefrom; a drill spindle rotatably mounted on said supporting portion and depending therefrom in parallel relation to said shafts; gearing for driving said drill spindles upon rotation of said shafts; a gear on each of said shafts; a driven gear for rotating said last named gears, said last named gears being movable into and out of registration with said driven gear upon movements of said shafts in said slots; and a clamping structure for clamping said shafts against movement in said slots and clamping said support against rotation about the shaft.

2. In a multiple drill head of the class described, a housing; a bottom on said housing, said bottom having an opening formed therein; a plate positioned in said opening and swingable relatively to said bottom, said plate having a pair of slots formed therein; a shaft projected through each of said slots and depending at one end below said bottom; a support rotatably mounted on each of said shafts and having a supporting portion extending radially outwardly therefrom; a drill spindle rotatably mounted on said supporting portion and depending therefrom in parallel relation to said shafts; a gearing for driving said drill spindles upon rotation of said shafts; a gear on each of said shafts; a driven gear for rotating said last named gears, said last named gears being movable into and out of registration with said driven gear upon movements of said shafts in said slots; and a clamping structure for clamping said shafts against movement in said slots and clamping said support against rotation about the shaft; said plate being swingable about the axis of said driving gear.

3. In a multiple drill head of the class described, a housing; a bottom on said housing, said bottom having an opening formed therein; a plate positioned in said opening and swingable relatively to said bottom, said plate having a pair of slots formed therein; a shaft projected through each of said slots and depending at one end below said bottom; a support rotatably mounted on each of said shafts and having a supporting portion extending radially outwardly therefrom; a drill spindle rotatably mounted on said supporting portion and depending therefrom in parallel relation to said shafts; a gearing for driving said drill spindles upon rotation of said shafts; a gear on each of said shafts; a driven gear for rotating said last named gears, said last named gears being movable in and out of registration with said driven gear upon movements of said shafts in said slots; and a clamping structure for clamping said shafts against movement in said slots and clamping said support against rotation about the shaft; said plate being swingable about the axis of said driving gear; an idler gear rotating on an axis parallel to the axis of said driven gear and meshing therewith; a driving gear for rotating said idler gear, said bottom having a slot formed therein outside of said opening; a third support overlying said last named slot; a supporting portion on said third support extending radially therefrom; a stud engaging in a slot formed in said bottom and projected through said last named supporting portion; a nut on said stud for threading thereon and securing said last named supporting portion in fixed relation to said bottom, said last named supporting portion being rotatable about said stud; a third drill spindle projected at one end through said third support and engaging in said first named slot in said bottom; a clamping structure for clamping said support in fixed relation to said bottom and releasable to permit swinging of said third support on said stud as an axis; and a gear fixedly mounted on said third named drill spindle meshing with said idler gear and movable into and out of meshing therewith upon movement of said third named spindle in said first named slot in said bottom.

4. In a multiple drill of the class described, a driving shaft; a gear fixedly mounted on said driving shaft; a supporting sleeve embracing said shaft and stationary relative thereto; a pair of housings swingably mounted on said supporting sleeve swingable on the axis of said shaft as a center; an idler gear in each of said housings meshing with said driving shaft; a driven gear in each of said housings meshing with the idler gear therein; a plate associated with each of said housings and swingable relatively thereto about the axis of said driven gear; a pair of drill spindles carried by each of said plates and extending exterior of said housing; a gear associated with each of said spindles and adapted for meshing with said driven gear for actuating the rotation of the spindles, said spindles being swingable relatively to the housing on the axis of said actuating gear, said actuating gear being bodily movable radially relatively to said plate for movement into and out of mesh with said driven gear and a clamping mechanism for clamping said actuating gear and said spindle in fixed relation to said housing.

5. In a multiple drill of the class described, a driving shaft; a gear fixedly mounted on said driving shaft; a supporting sleeve embracing said shaft and stationary relative thereto; a pair of housings swingably mounted on said supporting sleeve swingable on the axis of said shaft as a center; an idler gear in each of said housings meshing with said driving shaft; a driven gear in each of said housings meshing with the idler gear therein; a plate associated with each of said housings and swingable relatively thereto about the axis of said driven gear; a pair of drill spindles carried by each of said plates and extending exterior of said housing; a gear associated with each of said spindles and adapted for meshing with said driven gear for actuating the rotation of the spindles, said spindles being swingable relatively to the housing on the axis of said actuating gear, said actuating gear being bodily movable radially relatively to said plate for movement into and out of mesh with said driven gear and a clamping mechanism for clamping said actuating gear and said spindle in fixed relation to said housing, and a clamping mechanism for clamping said swingable plates against swingable movement of its housing.

6. In a multiple drill of the class described, a driving shaft; a gear fixedly mounted on said driving shaft; a supporting sleeve embracing said shaft and stationary relative thereto; a pair of housings swingably mounted on said supporting sleeve swingable on the axis of said shaft as a center; an idler gear in each of said housings meshing with said driving shaft; a driven gear in each of said housings meshing with the idler gear therein; a plate associated with each of said housings and swingable relatively thereto about the axis of said driven gear; a pair of drill spindles carried by each of said plates and extending exterior of said housing; a gear associated with each of said spindles and adapted for meshing with said driven gear for actuating the rotation of the spindles, said spindles being swingable relatively to the housing on the axis of said actuating gear, said actuating gear being bodily movable radially relatively to said plate for movement into and out of mesh with said driven gear and a clamping mechanism for clamping said actuating gear and said spindle in fixed relation to said housing and a clamping mechanism for clamping said swingable plates against swingable movement of its housing and a mechanism for securing said housings in fixed relation to the supporting sleeve.

THEODORE G. LINDERME.

REFERENCES CITED

The following references are of record in the file of this patent:

UNITED STATES PATENTS

| Number | Name | Date |
|---|---|---|
| 1,083,696 | Nelson | Jan. 6, 1914 |
| 1,449,164 | Buhr | Mar. 20, 1923 |
| 1,470,735 | Hey et al. | Oct. 16, 1923 |
| 1,521,158 | King | Dec. 30, 1924 |
| 2,156,581 | Campbell | May 2, 1939 |